United States Patent [19]

Reinhardt

[11] Patent Number: 4,931,532
[45] Date of Patent: Jun. 5, 1990

[54] METHOD OF SYNTHESIS OF THERMOPLASTIC AROMATIC BENZOXAZOLE POLYMERS

[75] Inventor: Bruce A. Reinhardt, New Carlisle, Ohio

[73] Assignee: The United States of America as represented by the Secretary of the Air Force, Washington, D.C.

[21] Appl. No.: 241,645

[22] Filed: Sep. 8, 1988

[51] Int. Cl.$^5$ .............................................. C08G 73/22
[52] U.S. Cl. ..................................... 528/185; 528/176; 528/179; 528/191
[58] Field of Search ................ 528/185, 176, 179, 191

[56] References Cited

U.S. PATENT DOCUMENTS 4,820,793  4/1989  Imai et al. ........................... 528/185

FOREIGN PATENT DOCUMENTS 3707125  10/1987  Fed. Rep. of Germany .......... 73/22
26876  12/1967  Japan .................................. 528/185

*Primary Examiner*—Harold D. Anderson
*Attorney, Agent, or Firm*—Charles E. Bricker; Donald J. Singer

[57] ABSTRACT

There is provided an aromatic benzoxazole polymer having repeating units of the formula

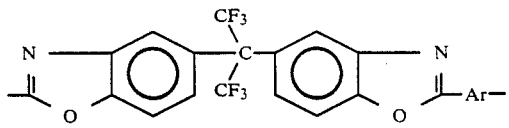

wherein Ar is

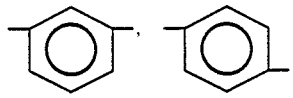

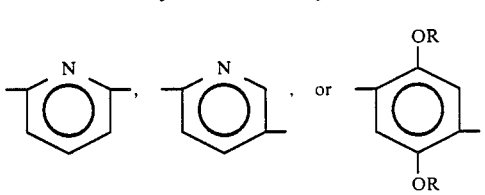

wherein R is an alkyl group having 8 to 12 carbon atoms.

The polymers of this invention are prepared by the polycondensation of 4,4'-hexafluoroisopropylidene bis(2-aminophenol) with a dicarboxylic acid selected from the group consisting of isophthalic acid, terephthalic acid, 2,5-pyridine dicarboxylic acid, 2,6-pyridine dicarboxylic acid and a 2,5-bis(alkoxy) terephthalic acid of the formula

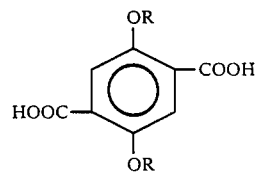

wherein R is an alkyl group having 8 to 12 carbon atoms, in a suitable reaction medium containing a suitable dehydrating agent.

9 Claims, No Drawings

METHOD OF SYNTHESIS OF THERMOPLASTIC AROMATIC BENZOXAZOLE POLYMERS

RIGHTS OF THE GOVERNMENT

The invention described herein may be manufactured and used by or for the Government of the United States for all governmental purposes without the Payment of any royalty.

BACKGROUND OF THE INVENTION

This invention relates to thermoplastic aromatic benzoxazole Polymers and to a method for synthesizing these polymers.

In recent years, there has been considerable interest in the utilization of thermoplastics as matrices in fiber reinforced composites. Thermoplastic matrices offer the possibility of lower fabrication costs of advanced structures, as compared to thermosetting resins. Such cost reductions are possible because, in general, faster and less expensive manufacturing procedures can be employed when using thermoplastic materials. In the past, one major drawback to the use of high performance thermoplastics as matrix resins has been the very high temperatures required for fabrication due to the high glass transition temperatures of these materials.

Aromatic benzoxazole polymers are excellent candidates for use in high temperature applications due to their excellent thermooxidative stability. These materials have, however, received minimal consideration as thermoplastic materials, generally, or as thermoplastic matrices, specifically, due to their relatively high glass transition temperatures. Such high glass transition temperatures make fabrication without degradation of the polymer extremely difficult.

Accordingly, it is an object of the present invention to provide aromatic benzoxazole polymers having relatively low glass transition temperatures.

It is another object of this invention to provide a method for preparing these polymers.

Other objects and advantages of the present invention will be apparent to those skilled in the art.

DESCRIPTION OF THE INVENTION

In accordance with the present invention, there is provided an aromatic benzoxazole polymer having repeating units of the formula

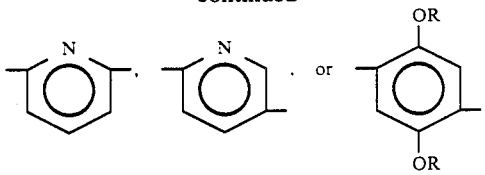

wherein Ar is

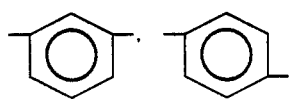

-continued

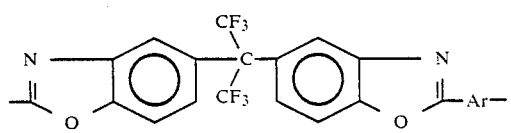

wherein R is an alkyl group having 8 to 12 carbon atoms.

The polymers of this invention are prepared by the polycondensation of 4,4'-hexafluoroisopropylidene bis-(2-aminophenol) with a dicarboxylic acid selected from the group consisting of isophthalic acid, terephthalic acid, 2,5-pyridine dicarboxylic acid, 2,6-pyridine dicarboxylic acid and a 2,5-bis(alkoxy) terephthalic acid of the formula

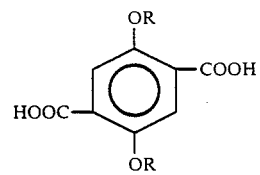

wherein R is an alkyl group having 8 to 12 carbon atoms, in a suitable reaction medium containing a suitable dehydrating agent.

The 2,5-bis(alkoxy) terephthalic acid may be prepared as described in Reinhardt and Unroe, application Serial No. 07/241,646, filed of even date, now U.S. Pat. No. 4,871,712 which is incorporated by reference.

The polycondensation reaction is carried out in a halogenated hydrocarbon which is a solvent for the monomers. Suitable solvents include dichlorobenzene, tolylchloride, dichlorotoluene, trichlorobenzene and the like. Suitable dehydrating agents include $P_2O_5$, $POCl_3$, $PCl_5$, trifluoroacetic anhydride-pyridine, trimethylsilyl polyphosphate (PPSE) and thionyl chloride. The presently preferred reaction medium is o-dichlorobenzene together with a non-acidic dehydrating agent, preferably trimethylsilyl polyphosphate (PPSE).

The polycondensation reaction is carried out at a temperature of about 150° C. to 225° C. for about 10 to 100 hours. It is convenient to employ a stepped heating schedule, e.g. about 150° C. to 180° C. for about 10 to 60 hours followed by about 170° C. to 225° C. for about 10 to 36 hours.

At the end of the reaction period, the reaction mixture is cooled to about room temperature. The polymer may then be recovered from the reaction mixture by any conventional technique, such as by pouring the reaction mixture into a non-solvent for the polymer, such as methanol.

The polymers of the present invention are useful as matrix materials in fiber reinforced composites and as hosts for molecular composites. The following examples illustrate the invention:

Example I

Polycondensation of 4,4'-hexafluoroisopropylidene bis(2-amino phenol) with isophthalic acid A mixture of 1.831 g (0.005 mol) of 4,4'-hexafluoroisopropylidene bis(2-aminophenol), 0.8307 g (0.005 mol) of recrystallized isophthalic acid, and 6.0 g PPSE in 15 ml of o-dichlorobenzene was heated by means of an oil bath to 160° C. under nitrogen for 24 hours. The temperature was then increased to 185° C. and maintained there for 24 additional hours during which time the polymer precipitated from solution. The polymerication mixture was allowed to cool and poured into stirring MeOH (500 ml). The precipitated polymer was filtered, chopped in a Warring blender with MeOH, filtered and air dried. Further purification was carried out by extracting the polymer with 33% aqueous ammonium hydroxide in a Soxhlet extractor for 18 hours. Upon washing with water and drying at 140° C. (1 mm Hg) overnight the polymer (1.98 g, 86%) had an inherent viscosity of 2.79 dl/g (methanesulfonic acid, 30° C. 20. g/dl). The thermal properties of this polymer are summarized in the Table following Example V.

Anal. Cald'd for $(C_{23}H_9F_6N_2O_2)_n$: C, 60.01; H, 2.19; N, 6.09. Found: C, 59.58; H, 2.38; N, 5.79.

EXAMPLE II

Polycondensation of 4,4'-hexafluoroisopropylidene bis(2-amino phenol) with terephthalic acid The procedure of Example I was followed, substituting terephthalic acid for the isophthalic acid. The thermal properties of this polymer are summarized in the Table following Example V.

Anal. Cald'd for $(C_{23}H_9F_6N_2O_2)_n$: C, 60.01; H, 2.19; N, 6.09. Found: C, 59.55; H, 2.53; N, 5.80.

EXAMPLE III

Polycondensation of 4,4'-hexafluoroisopropylidene bis(2-amino phenol) with 2,6-pyridine dicarboxylic acid The procedure of Example I was followed, substituting 2,6-pyridine dicarboxylic acid for the isophthalic acid. The thermal properties of this polymer are summarized in the Table following Example V.

Anal. Cald'd for $(C_{22}H_8 F_6N_3O_2)_n$: C, 57.28; H, 1.97; N, 9.11. Found: C, 56.75; H, 2.13; N, 8.93.

EXAMPLE IV

Polycondensation of 4,4'-hexafluoroisopropylidene bis(2-amino phenol) with 2,5-pyridine dicarboxylic acid The procedure of Example I was followed, substituting 2,5-pyridine dicarboxylic acid for the isophthalic acid. The thermal properties of this polymer are summarized in the Table following Example V.

Anal. Cald'd for $(C_{22}H_8F_6N_3O_2)_n$: C, 57.28; H, 1.97; N, 9.11. Found: C, 56.00; H, 2.29; N, 8.54.

EXAMPLE V

Polycondensation of 4,4'-hexafluoroisopropylidene bis(2-amino phenol) with 2,5-bis(Oxy-n-decyl) terephthalic acid A mixture of 1.8313 g (0.005 mol) of 4,4'-hexafluoroisopropylidene bis(2-aminophenol), 2.3933 g (0.005 mol) of 2.5- bis-(oxy-n-decyl) terephthalic acid, and 6.0 g of PPSE in 15 ml of o-dichlorobenzene was heated by means of an oil bath to 160° C. under nitrogen for 48 hours. The temperature was then increased to 185° C. and maintained therefor an additional 24 hours. The polymer solution was then allowed to cool to room temperature and was precipitated by pouring into 500 ml of stirring MeOH. The polymer was filtered, air dried, and further purified by reprecipitation from chloroform into methanol. The polymer was filtered and dried at 110° C. (1 mm Hg) for 24 hours to give 2.91 g (75%) with an inherent viscosity of 0.90 dl/g (methanesulfonic acid, 30° C., 0.17 g/dl). The thermal properties of this polymer are summarized in the following Table.

Anal. Calc'd for $(C_{43}H_{50}F_6N_2O_4)_n$: C, 66.82; H, 6.52; N, 3.63. Found: C, 66.14; H, 6.56; N, 3.37.

TABLE

Thermal Properties of Aromatic Thermoplastic Polybenzoxazoles

| Polymer | $n_{inh}$ (dl/g)[1] | $T_g$(°C.)[2] | T dec (°C.)[3] | ITA[4] |
|---|---|---|---|---|
| I | 2.82 | 300 | 532(air) 524(He) | 5% |
| II | 2.23 | 382 | 533(air) 525(He) | 6% |
| III | 1.82 | 329 | 539(air) 528(He) | 8% |
| IV | 2.18 | 352 | 530(air) 547(He) | 41% |
| V | 0.92 | 94 | 414(air) 426(He) | 50%[5] |

[1]Inherent viscosity in methane sulfonic acid (0.15 g/dl) at 30° C.
[2]Glass transition temperature determined by DSC in $N_2$. (T = 10° C./min)
[3]Decomposition temperature determined by thermogravimetric analysis in air and helium.
[4]Isothermal aging, weight loss after 200 hours at 650° F. (346° C.) in air.
[5]Weight loss after 50 hours at 650° F. (346° C.) in air.

Various modifications may be made without departing from the spirit of the invention as described herein or the scope of the appended claims.

I claim:

1. A method for preparing an aromatic benzoxazole polymer having repeating units of the formula

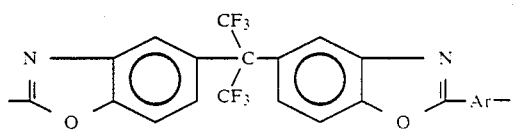

wherein Ar is

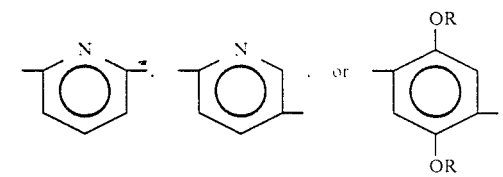

wherein R is an alkyl group having 8 to 12 carbon atoms, which comprises reacting 4,4'-hexafluoroisopropylidene bis-(2-aminophenol) with an aromatic dicarboxylic acid selected from the group consisting of isophthalic acid, terephthalic acid, 2,5-pyridine dicarboxylic acid, 2,6-pyridine dicarboxylic acid and a 2,5-bis(alkoxy) terephthalic acid of the formula

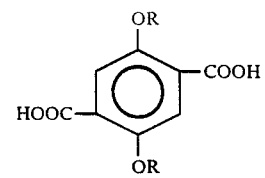

wherein R is an alkyl group having 8 to 12 carbon atoms, under reaction conditions in a reaction medium consisting essentially of a halogenated hydrocarbon solvent and a dehydrating agent, and recovering said polymer.

2. The method of claim 1 wherein said solvent is o-dichlorobenzene.

3. The method of claim 1 wherein said dehydrating agent is trimethylsilyl polyphosphate.

4. The method of claim 1 wherein said reaction is carried out at a temperature of about 150° to 225° C. for about 10 to 100 hours.

5. The method of claim 4 wherein said dicarboxylic acid is 2,5-bis(oxy-n-decyl) terephthalic acid, wherein said solvent is o-dichlorobenzene, wherein said dehydrating agent is trimethylsilyl polyphosphate, and wherein said reaction conditions are 160° C. for 48 hours followed by 185° C. for 24 hours.

6. The method of claim 4 wherein said dicarboxylic acid is isophthalic acid, wherein said solvent is o-dichlorobenzene, wherein said dehydrating agent is trimethylsilyl polyphosphate, and wherein said reaction conditions are 160° C. for 24 hours followed by 185° C. for 24 hours.

7. The method of claim 4 wherein said dicarboxylic acid is terephthalic acid, wherein said solvent is o-dichlorobenzene, wherein said dehydrating agent is trimethylsilyl polyphosphate, and wherein said reaction conditions are 160° C. for 24 hours followed by 185° C. for 24 hours.

8. The method of claim 4 wherein said dicarboxylic acid is 2,5-pyridine dicarboxylic acid, wherein said solvent is o-dichlorobenzene, wherein said dehydrating agent is trimethylsilyl polyphosphate, and wherein said reaction conditions are 160° C. for 24 hours followed by 185° C. for 24 hours.

9. The method of claim 4 wherein said dicarboxylic acid is 2,6-pyridine dicarboxylic acid, wherein said solvent is o-dichlorobenzene, wherein said dehydrating agent is trimethylsilyl polyphosphate, and wherein said reaction conditions are 160° C. for 24 hours followed by 185° C. for 24 hours.

* * * * *